2 Sheets—Sheet 1.

E. FISHER & J. WATSON.
Horse-Collar.

No. 224,671.      Patented Feb. 17, 1880.

WITNESSES:
W. W. Hollingsworth
Amos W. Hart

INVENTORS:
E. Fisher
John Watson
BY
ATTORNEYS.

N. PETERS, PHOTO-LITHOGRAPHER, WASHINGTON, D. C.

2 Sheets—Sheet 2.
E. FISHER & J. WATSON.
Horse-Collar.
No. 224,671. Patented Feb. 17, 1880.
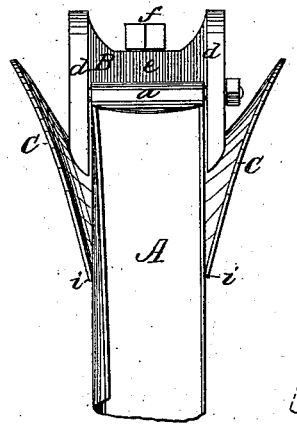
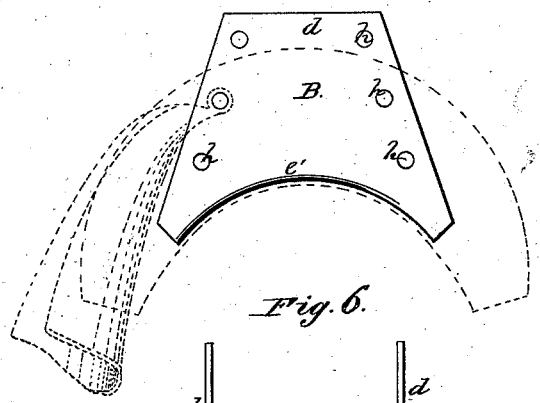
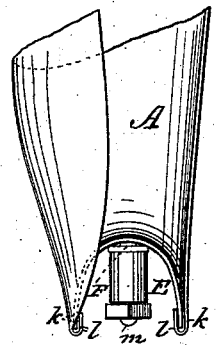
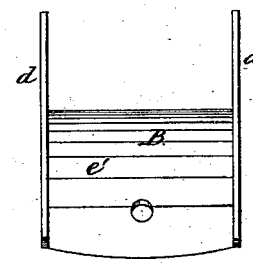
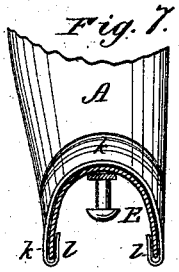
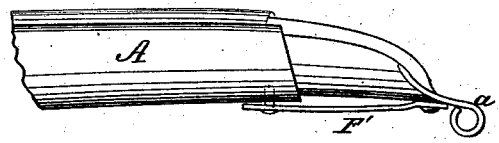
WITNESSES:
W. W. Hollingsworth
Amos W. Hart
INVENTORS;
E. Fisher
John Watson
BY
ATTORNEYS.

UNITED STATES PATENT OFFICE.

EBENEZER FISHER AND JOHN WATSON, OF KINCARDINE, ONTARIO, CANADA.

HORSE-COLLAR.

SPECIFICATION forming part of Letters Patent No. 224,671, dated February 17, 1880.

Application filed December 22, 1879.

*To all whom it may concern:*

Be it known that we, EBENEZER FISHER and JOHN WATSON, of Kincardine, Province of Ontario, Dominion of Canada, have invented a new and useful Improvement in Horse-Collars; and we do hereby declare that the following is a full, clear, and exact description of the same.

Metallic horse-collars have advantages over others which render their use very desirable. This is especially the case with collars which are swaged out of thin plates of steel, since such possess the greatest degree of lightness, strength, and cheapness which it is practicable to combine; but a great difficulty has been encountered in attempting to provide metallic collars with suitable couplings or fastenings which will not only connect the two halves or flanged sections of the same with the requisite security and rigidity, but also permit convenient adjustment, for the purpose of enlarging or diminishing the capacity of the collars, so as to adapt them for use on horses of different sizes, or on the same animals under different conditions. After many experiments we have succeeded in producing a flanged metallic collar whose fastenings are of such a character as to permit easy and quick adjustment for varying the width or length without weakening the connection and lessening the rigidity of the collar, and are at the same time light, compact, inexpensive, and durable.

Figure 1:
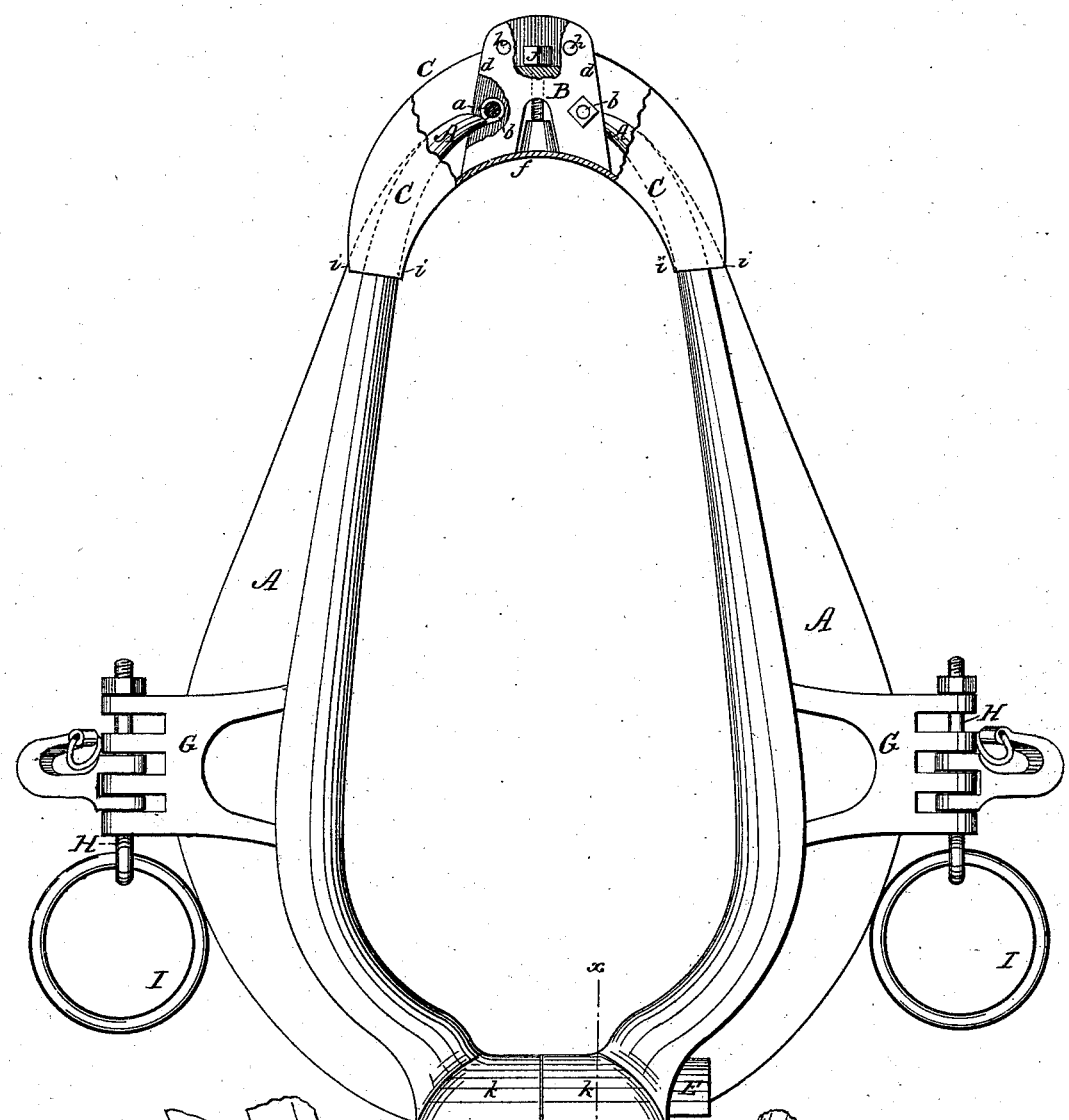
Figure 2:
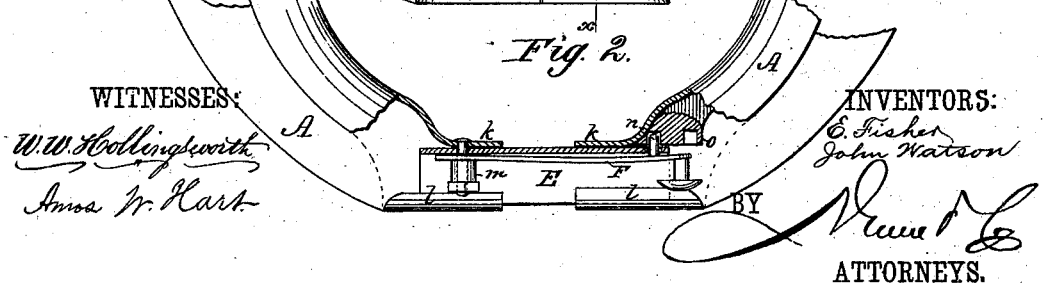

In the accompanying drawings, forming part of this specification, Figure 1 is a front view of the collar with parts broken away. Fig. 2 is a longitudinal section of the lower portion of the collar, showing the coupling thereof. Fig. 3 is a side view of the upper portion of the collar. Fig. 4 is a side view of the lower portion of the collar. Fig. 5 is a front view of an alternative form of coupling for the upper portion of the collar. Fig. 6 is a side view of the same. Fig. 7 is a cross-section on line $x\,x$, Fig. 1. Fig. 8 is a side view of the upper portion of one of the collar-sections, showing it so constructed as to be adjustable in length.

The two halves or independent sections A A of our combined collar and hame are each made, preferably, of sheet-steel swaged or struck up in dies which are so constructed as to give the proper distribution of metal for maximum strength and lightness. The form of the collar-sections A is mainly such as shown and described in previous patents granted to Ebenezer Fisher—that is to say, each section is convex on the inner side, concave on the outer side, and has laterally-projecting flanges, to which the hame-fastening $b$ is suitably attached.

The sections A A are hinged at one end and connected at the other, so as to admit of vertical and lateral adjustment, respectively. Their upper ends are provided with eyes $a$, and hinged, by means of pintles $b$, to a coupling, B, which is attached to a metal neck-pad or wearing-piece, C. In Figs. 1 and 3 this coupling B is shown of the form we prefer when the same is constructed of brass or malleable cast-iron, and in Figs. 5 and 6 of form we prefer when constructed of wrought metal (steel or iron) struck up in dies.

The main feature of the device is the parallel perforated flanges $d$ and a bridge, $e$, or base $e'$, which rigidly connects them. The cast-metal coupling is secured to the neck-pad by a bolt, $f$, that passes vertically through the bridge $e$, and the wrought-metal one is attached by rivets that are inserted through the base $e'$. The base portion of the coupling has a suitable curvature to adapt it to conform to that of neck-pad C.

The pintles or pivot-bolts $b$ may be adjusted higher or lower in the holes $h$ of the coupling-flanges $d$, for the purpose of varying the length of the collar. The edges of said flanges $d$ are inclined inward from the base upward, being thus made as nearly parallel as practicable to the general inclination of the respective sides A A of the collar to each other. The object of this is to preserve the proportions of the collar in respect to width when adjusting it in length, so that the general form of the collar-opening will remain substantially the same whether its size be greater or less.

The metallic neck-pad C is formed of a thin metal plate curved in a lengthwise direction and having its sides turned up. Its sides are narrowed toward the ends $i$, so that they will closely embrace and hold the collar-sections A A, which are pressed firmly between and against them when drawn together and fastened at the lower end.

We even prefer to make the neck-pad so narrow between the ends $i$ of its flanges that they shall be sprung slightly outward when the sections A are forced between them. Thus the pad is made to subserve the important function of strengthening the connection between the upper ends of the collar-sections, and thereby aids in preventing turning or twisting of the same when in use; and the same relation and function of parts are preserved whether the sections A be adjusted higher or lower.

The construction of the lower coupling or connection between the collar-sections A A is as follows: Each lower end, $k$, of the sections is horizontal and semi-tubular in cross-section, and provided with lips or flanges $l$, which are bent inward and embrace the edges of the semi-tubular coupling E. The said ends $k$ slide on the coupling E, so that the width of the collar may be adjusted as required. The form, construction, and connection of the ends and coupling, as shown, are such that the collar-sections A A are held rigidly in the required relation whatever be their adjustment laterally, and cannot turn, twist, or roll on the shoulders of the horse—a result it is of the highest importance to secure. At the same time that the coupling possesses the desired strength, it has also the scarcely less necessary qualities of maximum lightness, compactness, and cheapness with minimum number of parts.

Various devices may be employed to secure the parts in any adjustment. We show for this purpose a spring-catch, F, which is secured, together with the semi-tubular coupling E, to one end, $l$, of a section, A, by means of a screw-bolt, $m$.

The free end of the spring-catch has a lug, $n$, that passes through the coupling E and enters one of a series of holes in a bed-piece or bracket, $o$, attached to the end $k$ of the opposite section A. Thus the parts A may be quickly and easily adjusted for any required width by depressing the free end of the spring-catch F and drawing or pushing the end portions, $k$, toward or drawing them from each other.

In Fig. 8 we show the upper portion of one of the collar-sections divided transversely and one portion sliding on the other. A spring-catch, F′, secures them in any desired adjustment. When the collar-sections are closed on the pad the spring is in contact with the latter, and thus prevented from becoming detached or loosened.

The flanges of the sections A A are connected by angular braces G, to which a bolt, H, is attached to serve as a frame-fastening. A ring, I, is hung from the lower end of the bolt H, for attachment of the pole-strap.

While we prefer the form of coupling shown for the lower ends of the sections A, the semi-tubular piece may be dispensed with and one of the parts $k$ be fitted and adapted to slide in the other. In such case said parts are necessarily curved conformably to the arc of a circle whose center is the upper hinge of the collar.

Having thus described our improved collar, we claim—

1. The combination, with the metallic collar-sections and the curved neck-pad, of a coupling having parallel lateral flanges provided with perforations to receive the pintles or hinge-bolts of the sections, substantially as set forth.

2. The coupling having lateral perforated flanges and the bridge-piece $e$ and the fastening-bolt, in combination with the metallic neck-pad and flanged metallic collar-sections, as shown and described.

3. The collar-coupling consisting of flanges, perforated as specified, and a base or bridge which rigidly connects the flanges, substantially as set forth.

4. The combination, with a metallic collar composed of two flanged sections, of a curved metallic neck-pad whose ends are fitted to closely embrace or clasp said sections when connected or fastened together at the lower ends, substantially as set forth.

5. A wrought-metal collar-section having its upper end constructed with an eye and its lower end with a semi-tubular portion provided with lips or flanges, which, together with said eye, are formed integrally with the flanged body of the section, as shown and described.

6. The combination of the semi-tubular coupling and a fastening device with the metallic collar-sections having semi-tubular lower ends, $k$, provided with lips or flanges, as specified, and a coupling for the top of the collar, which has inclined perforated edges, as shown and described.

E. FISHER.
JOHN WATSON.

Witnesses:
JAMES H. GRIDLEY,
AMOS W. HART.